United States Patent
Nou et al.

(10) Patent No.: US 11,773,804 B2
(45) Date of Patent: Oct. 3, 2023

(54) ENGINE CONTROLLING METHOD AND ENGINE SYSTEM

(71) Applicant: Mazda Motor Corporation, Hiroshima (JP)

(72) Inventors: Yoshihisa Nou, Aki-gun (JP); Fumihiko Saito, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 17/897,058

(22) Filed: Aug. 26, 2022

(65) Prior Publication Data

US 2023/0069837 A1    Mar. 9, 2023

(30) Foreign Application Priority Data

Sep. 7, 2021   (JP) ................................ 2021-145494

(51) Int. Cl.
*F02D 41/40*   (2006.01)
*F02D 35/02*   (2006.01)
(Continued)

(52) U.S. Cl.
CPC ....... F02D 41/401 (2013.01); F02D 13/0234 (2013.01); F02D 35/023 (2013.01);
(Continued)

(58) Field of Classification Search
CPC .. F02D 41/401; F02D 13/0234; F02D 35/023; F02D 35/028; F02D 41/009; F02D 41/062; F02D 41/2477; F02D 2200/024; F02D 2200/0612; F02D 19/08; F02D 19/081; F02D 19/082; F02D 19/084;
(Continued)

(56) References Cited

U.S. PATENT DOCUMENTS 4,788,854 A * 12/1988 Javaherian ............ G01M 15/08
                                                          73/114.72
4,995,351 A *  2/1991 Ohkubo ................ F02D 41/345
                                                          123/90.11
(Continued)

FOREIGN PATENT DOCUMENTS

JP         2014234727 A     12/2014

*Primary Examiner* — Phutthiwat Wongwian
*Assistant Examiner* — Susan E Scharpf
(74) *Attorney, Agent, or Firm* — Alleman Hall Creasman & Tuttle LLP

(57) ABSTRACT

An engine controlling method is provided, which includes, during motoring of the engine, outputting, by an in-cylinder pressure sensor, to a controller a signal indicative of a reference pressure corresponding to a pressure change after an intake valve of a cylinder of the engine is closed when not performing fuel injection, and then injecting, by an injector, fuel for analysis into the cylinder at a specific timing after the intake valve is closed. The method includes, by the controller, acquiring a crank angle period from the intake valve close timing, through the fuel injection, to a timing of the in-cylinder pressure reaching the reference pressure based on signals from the in-cylinder pressure sensor and a crank angle sensor, and determining a property of the injected fuel by comparing the acquired crank angle period with that of a standard fuel based on stored information on a property of the standard fuel.

20 Claims, 5 Drawing Sheets

(51) Int. Cl.
    *F02D 41/00* (2006.01)
    *F02D 41/24* (2006.01)
    *F02D 41/06* (2006.01)
    *F02D 13/02* (2006.01)

(52) U.S. Cl.
    CPC ......... *F02D 35/028* (2013.01); *F02D 41/009* (2013.01); *F02D 41/062* (2013.01); *F02D 41/2477* (2013.01); *F02D 2200/024* (2013.01); *F02D 2200/0612* (2013.01)

(58) Field of Classification Search
    CPC .... F02D 19/085; F02D 19/087; F02D 19/088; F02D 19/06; F02D 19/0613; F02D 19/0615; F02D 19/0618; F02D 19/0623; F02D 19/0626; F02D 19/0634; F02D 19/0636; Y02T 10/30; Y02T 10/40
    USPC .................................................. 123/575–577
    See application file for complete search history.

(56) References Cited

U.S. PATENT DOCUMENTS

| | | | |
|---|---|---|---|
| 11,306,668 B1* | 4/2022 | Fulton | F02D 13/0207 |
| 2007/0079647 A1* | 4/2007 | Aoyama | F02D 19/0636 |
| | | | 73/35.02 |
| 2009/0299605 A1* | 12/2009 | Kweon | F02D 19/0652 |
| | | | 701/103 |
| 2011/0315101 A1* | 12/2011 | Cleary | F02D 41/006 |
| | | | 123/90.15 |
| 2012/0239276 A1* | 9/2012 | Nishiumi | F02D 41/0025 |
| | | | 701/103 |
| 2014/0000557 A1* | 1/2014 | Glugla | F02D 41/008 |
| | | | 123/434 |
| 2017/0356379 A1* | 12/2017 | Hotta | F02D 19/0655 |
| 2018/0321105 A1* | 11/2018 | Barta | G01L 23/22 |
| 2023/0077080 A1* | 3/2023 | Nou | F02D 35/028 |
| 2023/0077202 A1* | 3/2023 | Nou | F02D 35/028 |

* cited by examiner

ENGINE CONTROLLING METHOD AND ENGINE SYSTEM

TECHNICAL FIELD

The present disclosure relates to a method of controlling an engine and an engine system.

BACKGROUND OF THE DISCLOSURE

JP2014-234727A discloses a technique for creating a heat release rate waveform of a low-temperature oxidation reaction, after fuel is injected into a cylinder, by setting a reaction start timing of fuel according to a period during which the fuel floats so as to be on a more advancing side (the lower temperature side of a reaction startable temperature of the low-temperature oxidation reaction) as the floating period is longer. According to this technique, the combustion state can be diagnosed with sufficient accuracy.

Meanwhile, various additives are contained in the fuel supplied to automobile engines, and the type and the combination rate of the additives are different for different manufacturers. Therefore, the properties of the fuel supplied to the automobile engines are not always the same. In some cases, biofuel may be supplied to the engines. The property of the biofuel may be completely different from the property of the fossil fuel. In the future, it is expected that fuel of various properties will be supplied to engines.

On the other hand, a controller of the engine controls the engine by setting beforehand a fuel injection timing and a fuel injection amount which are used for optimal combustion based on the property of a standard fuel. If the property of fuel supplied to the automobile is different from the standard fuel, it may cause misfire or rapid combustion. Therefore, there is a demand of accurately determining the property of fuel supplied to the engine.

SUMMARY OF THE DISCLOSURE

The technique disclosed herein enables a determination of the property of fuel supplied to an engine with sufficient accuracy.

According to one aspect of the present disclosure, a method of controlling an engine is provided, which includes, during motoring of the engine, outputting, by an in-cylinder pressure sensor, to a controller a signal indicative of a reference pressure corresponding to a pressure change inside a cylinder of the engine after an intake valve of the cylinder is closed when a fuel injection is not performed. The method includes, during motoring of the engine after the reference pressure is outputted, injecting, by an injector, fuel for analysis into the cylinder at a specific timing after the intake valve is closed. The method includes acquiring, by the controller, a crank angle period from a close timing of the intake valve, through the fuel injection, to a timing of the pressure inside the cylinder reaching the reference pressure, based on signals from the in-cylinder pressure sensor and a crank angle sensor. The method includes determining, by the controller, a property of the fuel injected by the injector by comparing the acquired crank angle period with a reference crank angle period from the close timing of the intake valve to a timing of the pressure inside the cylinder reaching the reference pressure, after a standard fuel is injected into the cylinder at the specific timing, based on stored information on a reference property of the standard fuel.

According to this configuration, the in-cylinder pressure sensor measures the pressure change inside the cylinder during motoring of the engine. Here, "motoring of the engine" refers to a state where a crankshaft of the engine starts rotation by a drive source outside of the engine, such as a generator, an electric motor, or a starter motor. The motoring of the engine corresponds to a startup of the engine. The startup of the engine corresponds to, in the case of engine vehicles, when an ignition switch of an automobile being turned on by a person onboard, or, in the case of hybrid vehicles, when an engine is started for, for example, a demand of generating power, and satisfying a demand torque.

During motoring of the engine, intake stroke, compression stroke, expansion stroke, and exhaust stroke are performed inside the cylinder, by an external driving force. The in-cylinder sensor measures the changed pressure in compression stroke after the intake valve is closed. The changed pressure is when only air inside the cylinder is compressed, which is used as the reference pressure.

Once the reference pressure is measured, the injector injects fuel into a next cylinder during motoring of the engine. In detail, at a specific timing during compression stroke after the intake valve is closed, the injector injects fuel for analysis to the cylinder. The "fuel for analysis" may be a small amount of fuel with which a high-temperature oxidation reaction does not occur even when a piston reaches a compression top dead center. The "fuel for analysis" is fuel to be supplied into the cylinder in order to determine the property of the fuel.

When the fuel is injected into the cylinder in compression stroke during which the temperature and the pressure inside the cylinder increase gradually, the pressure and the temperature inside the cylinder drop temporarily below the reference pressure and a corresponding reference temperature due to the latent heat of the vaporizing fuel. Then, as compression stroke progresses, the fuel results in a low-temperature oxidation reaction through fission, atomization, evaporation, and mixing with air according to the progress of time. Meanwhile, the in-cylinder pressure is returned to the reference pressure. If the property of fuel (for example, the boiling point and/or the latent heat of vaporization) differs, a period of time from the fuel injection into the cylinder to the evaporation of the fuel differs, which results in the difference in a period of time after the in-cylinder pressure is dropped below the reference pressure until it returns to the reference pressure.

The controller acquires the crank angle period from the close timing of the intake valve, through the fuel injection, to the timing of the in-cylinder pressure reaching the reference pressure, based on the signals from the in-cylinder pressure sensor and the crank angle sensor. If the fuel injected by the injector is fuel with a low boiling point and which evaporates easily, the crank angle period is relatively short, and on the other hand, if the fuel is fuel with a high boiling point and which does not easily generate heat, the crank angle period is relatively long.

The controller stores information on the property of the standard fuel. The "standard fuel" is, for example, fuel corresponding to K2202 (Motor Gasoline) or K2204 (Diesel Fuel) defined by Japanese Industrial Standards (JIS). Based on the information on the property of the standard fuel, the controller can acquire the crank angle period from the close timing of the intake valve until the in-cylinder pressure returns to the reference pressure, through the injection of the standard fuel at the specific timing. Further, the controller compares the measured crank angle period with the crank angle period of the standard fuel.

In detail, when the measured crank angle period is shorter than the crank angle period of the standard fuel, the fuel injected from the injector is fuel with a low boiling point and which evaporates easily. Therefore, with this type of fuel, premixing progresses easily under the engine operation after the startup is finished (that is, when the engine operates by the fuel injected into the cylinder being combusted, unlike the motoring). Thus, in a lean mixture gas state, the fuel does not easily cause the low-temperature oxidation reaction and the subsequent high-temperature oxidation reaction, resulting in ignition that is difficult. As a result, the combustion may be slow, leading to a reduction in torque and degradation of fuel efficiency. On the other hand, in a rich mixture gas state, the mixture gas is ignited to combust at once, which may increase combustion noise.

On the other hand, when the measured crank angle period is longer than the crank angle period of the standard fuel, the fuel injected from the injector is fuel with a high boiling point and which does not easily evaporate. Therefore, with this type of fuel, the premixing is difficult to progress under the engine operation after the startup is finished, which tends to cause diffuse combustion. In this case, the combustion may become rapid and combustion noise may increase. Further, in an excessively rich part of the mixture gas, soot may increase.

This technique is made by focusing on that the boiling point and/or the latent heat of vaporization varies depending on fuel. Based on the fact that the characteristic of fuel vaporization inside the cylinder varies depending on the boiling point and/or the latent heat of vaporization of the fuel injected into the cylinder, the controller compares the crank angle period from the close timing of the intake valve to the timing of the in-cylinder pressure reaching the reference pressure after the fuel injection. The controller can determine the property of fuel supplied to the engine with sufficient accuracy.

Particularly, the determination of the fuel property is performed during motoring of the engine. Since the high-temperature oxidation reaction of fuel does not occur, the controller can determine the fuel property without being influenced by heat or residual gas. Thus, the controller can determine more accurately the property of fuel supplied to the engine.

The cylinder may be one of a plurality of cylinders, and the in-cylinder pressure sensor may output a signal indicative of the reference pressure inside the cylinder, out of the plurality of cylinders, whose intake valve is closed first, after a crankshaft of the engine starts rotation.

According to this configuration, the in-cylinder pressure sensor can measure the reference pressure in a case where air inside the cylinder is compressed, without being influenced by heat or residual gas. As the engine cycle progresses, the rotation speed of the crankshaft gradually increases, which gradually increases the temperature inside the cylinder. Thus, by measuring the reference pressure inside the cylinder whose intake valve is closed first after the crankshaft of the engine starts rotation, the in-cylinder pressure sensor can measure the reference pressure accurately.

The injector may inject the fuel for analysis into each of the plurality of cylinders as a cycle of the engine progresses. The controller may acquire the crank angle period for each of the plurality of cylinders. The controller may compare an average value of the plurality of crank angle periods with the reference crank angle period to determine the property.

According to this configuration, by determining the fuel property based on the average value of the plurality of crank angle periods, determination accuracy of the controller is improved.

The reference crank angle period may become shorter as the cycle progresses.

As described above, as the cycle of the engine progresses, the temperature inside the cylinder increases gradually. The in-cylinder temperature increase stimulates evaporation of the fuel injected into the cylinder, and shortens the crank angle period until reaching the reference pressure. Since the crank angle period of the standard fuel becomes shorter as the cycle progresses, the crank angle period can be measured for each of the plurality of cycles, while eliminating the influence of the temperature increase. Thus, the controller can determine the fuel property more accurately, based on the plurality of crank angle periods.

The controller may correct at least one of a start timing of the fuel injection, and the close timing of the intake valve, according to the property of the fuel, after the startup of the engine is finished.

If the fuel injected by the injector tends to evaporate easily, this may result in the degradation of fuel efficiency or the increase in combustion noise, as described above. On the other hand, if the fuel injected from the injector is fuel which is difficult to evaporate, this may result in the reduction in emission gas performance or the increase in combustion noise, as described above.

According to this configuration, by the controller correcting at least one of the fuel injection start timing and the close timing of the intake valve, according to the fuel property, the combustion is regarded to be standardized regardless of the fuel property. That is, it can make the combustion equivalent to the combustion with the standard fuel regardless of the fuel property. It is advantageous for the improvement in fuel efficiency of the engine and the improvement in emission gas performance. Further, the increase in combustion noise can be suppressed.

When the acquired crank angle period is longer than the reference crank angle period, the controller may correct the fuel injection start timing to an advancing side, and when the acquired crank angle period is shorter than the reference crank angle period, the controller may correct the fuel injection start timing to a retarding side.

When the acquired crank angle period is longer than that of the standard fuel, the fuel is relatively difficult to evaporate. Thus, the fuel injection start timing is corrected to the advancing side. When the fuel injection start timing is advanced, the time for the evaporation of the fuel can be secured. Since the fuel evaporates at a desired timing even if the fuel does not easily evaporate, this combustion becomes equivalent to the combustion of the standard fuel. On the contrary, when the acquired crank angle period is shorter than that of the standard fuel, the fuel is relatively easy to evaporate. Thus, the fuel injection start timing is corrected to the retarding side. Since a timing at which the evaporation of the fuel finishes becomes later as the fuel injection start timing is retarded, the fuel evaporates at a desired timing. Even if the fuel is easy to evaporate, this combustion becomes equivalent to the combustion of the standard fuel.

The controller may correct the fuel injection start timing so that the fuel injection start timing is advanced when the acquired crank angle period is longer than the reference crank angle period. When the fuel injection timing reaches a first timing on the advancing side, the controller may advance the close timing of the intake valve when the acquired crank angle period is longer than the reference crank angle period.

According to this configuration, by advancing the fuel injection start timing, the evaporation time of the fuel becomes longer. However, if the fuel injection start timing is advanced, a period between the close timing of the intake valve and the fuel injection start timing becomes short, and therefore, the in-cylinder pressure at the fuel injection start timing becomes low. If the in-cylinder pressure is too low, a differential pressure between the injection pressure of the fuel and the in-cylinder pressure becomes large, and a penetrating force (penetration) of the fuel spray increases. As a result, the injected fuel adheres to the surface of the cylinder, etc., thereby impeding the evaporation of the fuel. Thus, the controller does not advance the fuel injection start timing beyond the first timing. Instead, the controller advances the close timing of the intake valve. Since the temperature and the in-cylinder pressure increase accordingly, the inside of the cylinder becomes an environment where the fuel evaporates easily. As a result, when the fuel does not easily evaporate, this combustion becomes equivalent to the combustion of the standard fuel.

The controller may correct the fuel injection start timing so that the fuel injection start timing is retarded when the acquired crank angle period is shorter than the reference crank angle period. When the fuel injection timing reaches a second timing on the retarding side, the controller may retard the close timing of the intake valve when the acquired crank angle period is shorter than the reference crank angle period.

According to this configuration, by retarding the fuel injection start timing, the evaporation time of the fuel becomes shorter. However, if the fuel injection start timing is retarded, since an end timing of the fuel injection becomes closer to a compression top dead center, the evaporation time of the fuel injected in the second half becomes too short. This tends to cause generation of soot. Thus, the controller does not retard the fuel injection start timing beyond the second timing. Instead, the controller retards the close timing of the intake valve. Since the temperature and the pressure inside the cylinder drop accordingly, the evaporation of the fuel becomes slow. As a result, when the fuel is easy to evaporate, the combustion becomes equivalent to the combustion of the standard fuel.

According to another aspect of the present disclosure, an engine system including an engine is provided, which includes a controller that stores information regarding a property of a standard fuel, an injector that injects fuel into a cylinder of the engine, in response to a control signal of the controller, an in-cylinder pressure sensor that is attached to the engine, and outputs to the controller a pressure signal corresponding to a pressure inside the cylinder, and a crank angle sensor that is attached to the engine, and outputs to the controller a crank angle signal corresponding to a crank angle of the engine. During motoring of the engine, the in-cylinder pressure sensor outputs a signal indicative of a reference pressure corresponding to a pressure change inside the cylinder after an intake valve of the cylinder is closed when a fuel injection is not performed. During motoring of the engine after the reference pressure is outputted, the controller causes the injector to inject fuel for analysis at a specific timing after the intake valve is closed. The controller acquires a crank angle period from the close timing of the intake valve, through the fuel injection, to a timing of the pressure inside the cylinder reaching the reference pressure, based on the crank angle signal of the crank angle sensor and the pressure signal of the in-cylinder pressure sensor. The controller determines a property of the fuel injected by the injector, based on a comparison of the acquired crank angle period with a reference crank angle period from the close timing of the intake valve to a timing of the pressure inside the cylinder reaching the reference pressure after the standard fuel is injected into the cylinder at the specific timing, based on stored information on a reference property of the standard fuel.

According to this configuration, the controller can determine the property of fuel supplied to the engine, with sufficient accuracy, during motoring of the engine.

DETAILED DESCRIPTION OF THE DISCLOSURE

Hereinafter, one embodiment of a method of controlling an engine and an engine system is described with reference to the accompanying drawings. The controlling method and the engine system which are described herein are merely illustration.

Figure 1:
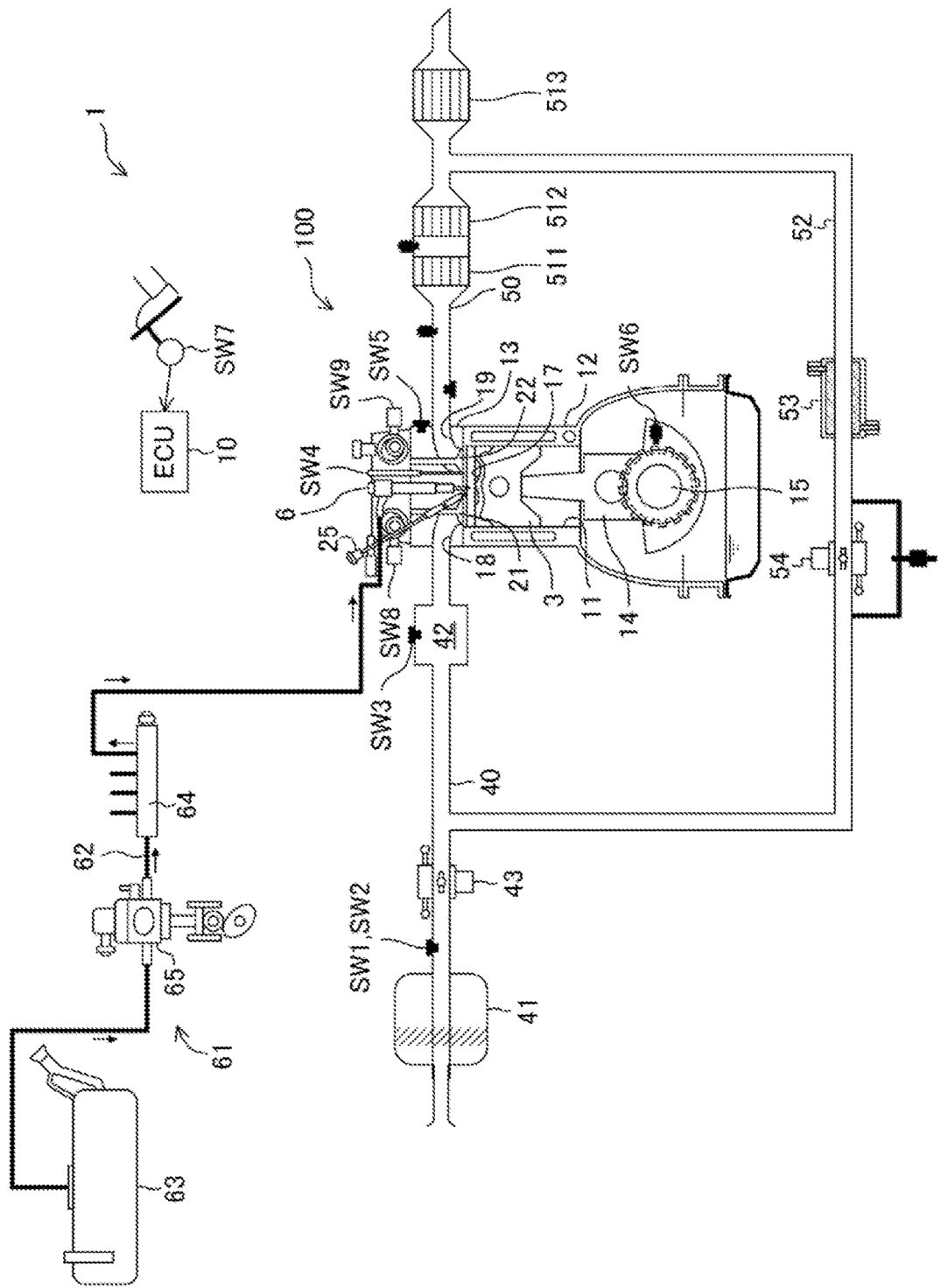
FIG. 1 illustrates an engine system.
Figure 2:
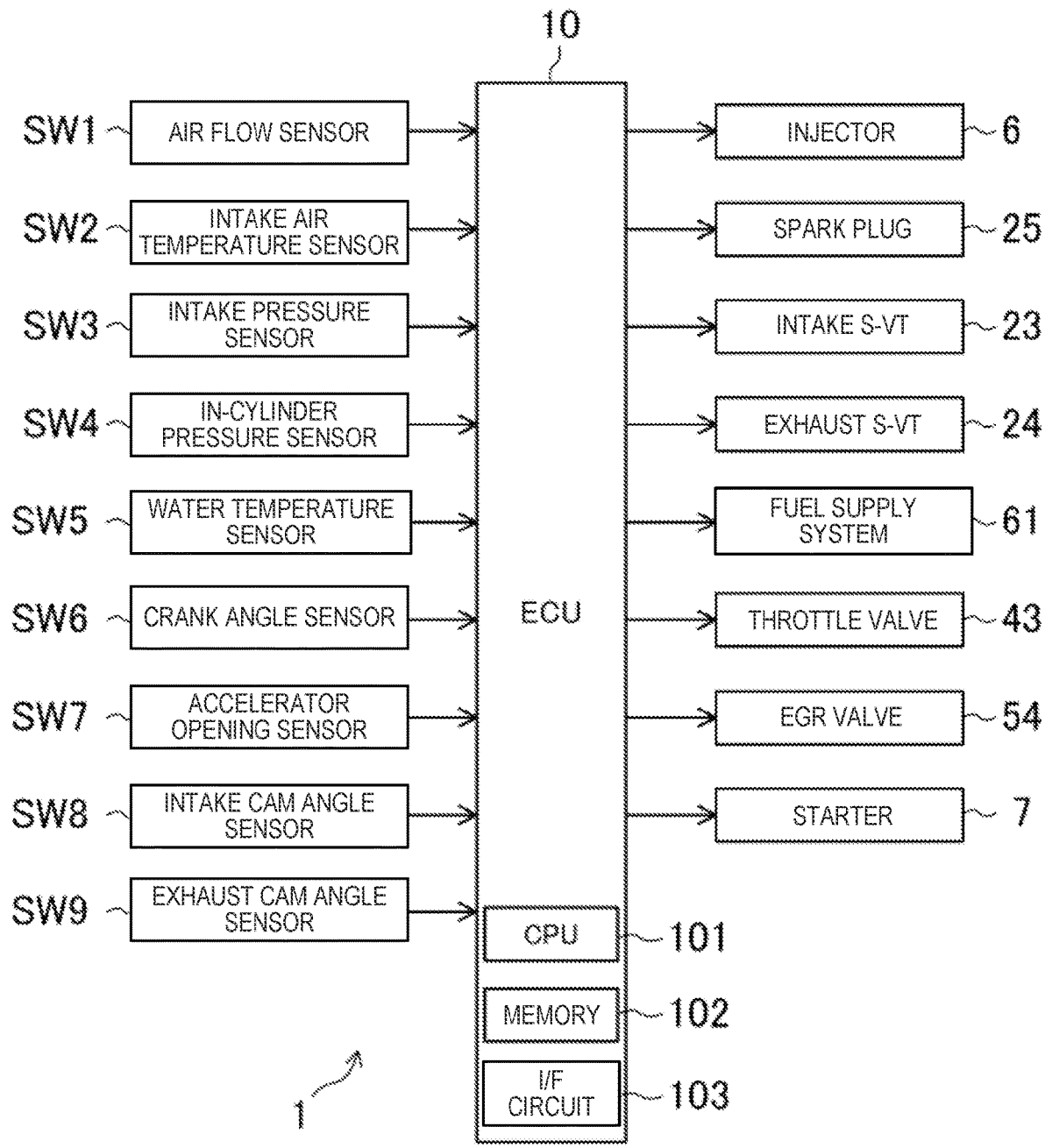
FIG. 2 illustrates the engine system.

FIG. 1 is a view illustrating an engine system 1. The engine system 1 is mounted on a four-wheeled automobile. The engine system 1 includes an engine 100 and a controller which controls the engine 100. The controller is an ECU (Engine Control Unit) 10 which will be described later. FIG. 2 is a block diagram illustrating a configuration related to the control of the engine system 1.

The engine 100 has a cylinder 11. Inside the cylinder 11, intake stroke, compression stroke, expansion stroke, and exhaust stroke are repeated. The engine 100 is a four-stroke engine. The automobile is propelled by the engine 100 in operation. Fuel of the engine 100 is gasoline in this example configuration. The engine 100 may be configured so that a mixture gas combusts by self-ignition in at least a part of the operating range. Note that the fuel of the engine 100 may be diesel fuel.

(Configuration of Engine)

The engine 100 includes a cylinder block 12 and a cylinder head 13. A plurality of cylinders 11 are formed in the cylinder block 12. The engine 100 is a multi-cylinder engine. In FIG. 1, only one cylinder 11 is illustrated.

A piston 3 is inserted in each cylinder 11. The piston 3 is coupled to a crankshaft 15 via a connecting rod 14. The piston 3, the cylinder 11, and the cylinder head 13 form a combustion chamber 17.

The geometric compression ratio of the engine system 1 is set to a high value for the purpose of improvement in theoretical thermal efficiency. In detail, the geometric compression ratio c of the engine system 1 is 14.0:1.0 or higher. The geometric compression ratio may be 18:1, for example. The geometric compression ratio may be set suitably within a range of 14:1 or higher and 20:1 or lower.

An intake port 18 is formed in the cylinder head 13 for every cylinder 11. The intake port 18 communicates with the inside of the cylinder 11.

An intake valve 21 is disposed at the intake port 18, and opens and closes the intake port 18. The intake valve 21 is a poppet valve. A valve operating mechanism has an intake cam shaft, and is mechanically connected to the intake valves 21. The valve operating mechanism opens and closes the intake valves 21 at a given timing. The valve operating mechanism is a variable valve operating mechanism which varies a valve timing and/or a valve lift. As illustrated in FIG. 2, the valve operating mechanism has an intake S-VT (Sequential-Valve Timing) 23. The intake S-VT 23 continuously changes a rotation phase of the intake cam shaft with respect to the crankshaft 15 within a given angle range. A valve opening period of the intake valve 21 does not change. The intake S-VT 23 is a variable phase mechanism. The intake S-VT 23 is of an electric or hydraulic type.

An exhaust port 19 is formed in the cylinder head 13 for every cylinder 11. The exhaust port 19 communicates with the inside of the cylinder 11.

An exhaust valve 22 is disposed at the exhaust port 19, and opens and closes the exhaust port 19. The exhaust valve 22 is a poppet valve. The valve operating mechanism has an exhaust cam shaft and is mechanically connected to the exhaust valves 22. The valve operating mechanism opens and closes the exhaust valves 22 at a given timing. The valve operating mechanism is a variable valve operating mechanism which varies a valve timing and/or a valve lift. As illustrated in FIG. 2, the valve operating mechanism has an exhaust S-VT 24. The exhaust S-VT 24 continuously changes a rotation phase of the exhaust cam shaft with respect to the crankshaft 15 within a given angle range. A valve opening period of the exhaust valve 22 does not change. The exhaust S-VT 24 is a variable phase mechanism. The exhaust S-VT 24 is of an electric or hydraulic type.

An injector 6 is attached to the cylinder head 13 for every cylinder 11. The injector 6 directly injects fuel into the cylinder 11.

A fuel supply system 61 is connected to the injector 6. The fuel supply system 61 includes a fuel tank 63 which stores the fuel, and a fuel supply line 62 which connects the fuel tank 63 to the injector 6. A fuel pump 65 and a common rail 64 are provided in the fuel supply line 62. The fuel pump 65 pumps the fuel to the common rail 64. The common rail 64 stores the fuel pumped from the fuel pump 65, at a high fuel pressure. When a valve of the injector 6 opens, the fuel stored in the common rail 64 is injected into the cylinder 11 from a nozzle hole of the injector 6. Note that the configuration of the fuel supply system 61 is not limited to the configuration described above.

A spark plug 25 is attached to the cylinder head 13 for every cylinder 11. The spark plug 25 forcibly ignites the mixture gas inside the cylinder 11.

An intake passage 40 is connected to one side surface of the engine 100. The intake passage 40 communicates with the intake port 18 of each cylinder 11. Air introduced into the cylinder 11 flows through the intake passage 40. An air cleaner 41 which filters the air is disposed at an upstream end part of the intake passage 40. A surge tank 42 is disposed near a downstream end of the intake passage 40. The intake passage 40 downstream of the surge tank 42 constitutes independent intake passages which are branched for every cylinder 11. Downstream ends of the independent intake passages are connected to the intake ports 18 of the respective cylinders 11.

A throttle valve 43 is disposed in the intake passage 40, between the air cleaner 41 and the surge tank 42. The throttle valve 43 adjusts an amount of air introduced into the cylinder 11 by being adjusted an opening of its valve.

An exhaust passage 50 is connected to the other side surface of the engine 100. The exhaust passage 50 communicates with the exhaust port 19 of each cylinder 11. The exhaust passage 50 is a passage through which exhaust gas discharged from the cylinder 11 flows. Although the detailed illustration is omitted, an upstream part of the exhaust passage 50 constitutes independent exhaust passages which are branched for every cylinder 11. Upstream ends of the independent exhaust passages are connected to the exhaust ports 19 of the respective cylinders 11.

An exhaust emission control system having a plurality of catalytic converters is disposed in the exhaust passage 50. The upstream catalytic converter has a three-way catalyst 511 and a GPF (Gasoline Particulate Filter) 512, for example. The downstream catalytic converter has a three-way catalyst 513. Note that the exhaust emission control system is not limited to the illustrated configuration. For example, the GPF may be omitted. Further, the catalytic converter is not limited to what has the three-way catalyst. Moreover, the disposed order of the three-way catalysts and the GPF may be changed suitably.

An exhaust gas recirculation (EGR) passage 52 is connected between the intake passage 40 and the exhaust passage 50. The EGR passage 52 is a passage for recirculating a part of exhaust gas to the intake passage 40. An upstream end of the EGR passage 52 is connected between the upstream catalytic converter and the downstream catalytic converter in the exhaust passage 50. A downstream end of the EGR passage 52 is connected between the throttle valve 43 and the surge tank 42 in the intake passage 40.

A water-cooled EGR cooler 53 is disposed in the EGR passage 52. The EGR cooler 53 cools exhaust gas. An EGR valve 54 is also disposed in the EGR passage 52. The EGR valve 54 adjusts a flow rate of exhaust gas which flows through the EGR passage 52. By adjusting the opening of the EGR valve 54, a recirculating amount of external EGR gas can be adjusted.

As illustrated in FIG. 2, the engine system 1 is provided with the ECU (Engine Control Unit) 10 for operating the engine 100. The ECU 10 is a controller based on a well-known microcomputer. The ECU 10 includes a CPU (Central Processing Unit) 101 which executes a program, memory 102 which is comprised of, for example, RAM (Random Access Memory) and ROM (Read Only Memory) and stores the program and data, and an input and output (I/F) circuit 103 which inputs/outputs an electric signal. The ECU 10 is one example of a controller in the present disclosure.

As illustrated in FIGS. 1 and 2, the ECU 10 is connected to various kinds of sensors SW1-SW9. The sensors SW1-SW9 output signals to the ECU 10. The sensors include the following sensors:

Air flow sensor SW1: Disposed in the intake passage 40, downstream of the air cleaner 41, and measuring a flow rate of air which flows through the intake passage 40;

Intake air temperature sensor SW2: Disposed in the intake passage 40, downstream of the air cleaner 41, and measuring the temperature of air which flows through the intake passage 40;

Intake pressure sensor SW3: Attached to the surge tank 42, and measuring the pressure of air introduced into the cylinder 11;

In-cylinder pressure sensor SW4: Attached to the cylinder head 13 corresponding to each cylinder 11, and measuring the pressure inside each cylinder 11;

Water temperature sensor SW5: Attached to the engine 100, and measuring the temperature of coolant;

Crank angle sensor SW6: Attached to the engine 100, and measuring a rotation angle of the crankshaft 15;

Accelerator opening sensor SW7: Attached to an accelerator pedal mechanism, and measuring an accelerator opening corresponding to an operating amount of the accelerator pedal;

Intake cam angle sensor SW8: Attached to the engine 100, and measuring a rotation angle of the intake cam shaft; and Exhaust cam angle sensor SW9: Attached to the engine 100, and measuring a rotation angle of the exhaust cam shaft.

The ECU 10 determines the operating state of the engine 100 based on the signals from the sensors SW1-SW9, and calculates a controlled variable of each device according to the control logic defined beforehand. The control logic is stored in the memory 102, and includes calculating a targeted amount and/or a controlled variable by using a map stored in the memory 102.

The ECU 10 outputs the electric signals according to the calculated controlled variables to the injector 6, the spark plug 25, the intake S-VT 23, the exhaust S-VT 24, the fuel supply system 61, the throttle valve 43, and the EGR valve 54.

The engine 100 is also provided with a starter 7, which is coupled to the crankshaft 15 of the engine 100. The starter 7 is an electric motor. When a driver turns on an ignition switch, the ECU 10 outputs an electric signal to the starter 7. When the starter 7 is turned on, it rotates the crankshaft 15. Then, motoring of the engine 100 is started. After the motoring is started, the ECU 10 outputs the electric signals to the injector 6 and the spark plug 25 to finish startup of the engine 100.

(Determination of Fuel Property)

The property of the fuel supplied to the fuel tank 63 is not always the same. The property of the fuel supplied to the fuel tank 63 may change greatly compared with a standard fuel.

The memory 102 of the ECU 10 stores a map which is set based on the property of the standard fuel, and the ECU 10 controls the engine 100 by using the map based on the standard fuel. If the property of the fuel supplied to the engine 100 is changed from the property of the standard fuel, it may cause misfire or rapid combustion.

Thus, this engine system 1 determines the property of the fuel supplied to the engine 100. Further, the engine system 1 corrects the controlled variables of the engine 100 according to the determined property of the fuel.

First, a method of determining the fuel property is described with reference to the drawings. The ECU 10 determines the fuel property during the motoring of the engine 100. The motoring of the engine 100 is a state where the starter 7 is rotating the crankshaft 15, and the high-temperature oxidation reaction does not occur inside the cylinder 11. During the motoring of the engine 100, since heat is not generated by the reaction of fuel inside the cylinder 11 and residual combustion gas is not produced, the ECU 10 can determine the property of fuel, without receiving these influences. Therefore, the determination accuracy is improved.

Figure 3:
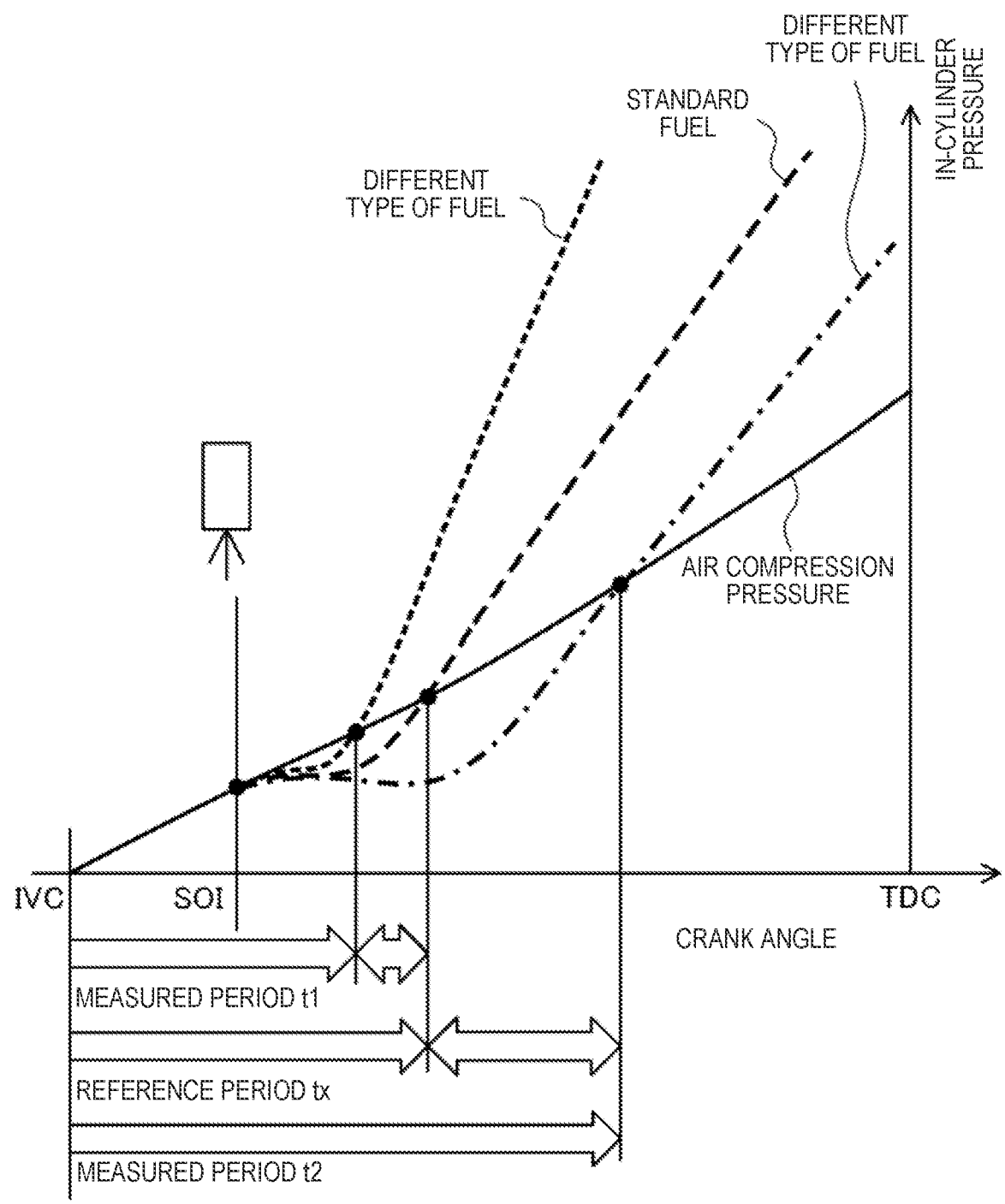
FIG. 3 illustrates a difference in a pressure change inside a cylinder when injecting a plurality of kinds of fuel with different properties.

FIG. 3 illustrates a change of the pressure inside a certain cylinder 11 during the motoring of the engine 100. In FIG. 3, the horizontal axis indicates a progress of the crank angle, and the vertical axis indicates a pressure inside the cylinder 11. As illustrated by a solid line, after the intake valve 21 is closed (i.e., IVC), the pressure inside the cylinder 11 starts to increase as the piston 3 moves upward.

For the cylinder 11 whose intake valve 21 is closed first after the crankshaft 15 started rotation, the ECU 10 measures a changing pressure inside the cylinder 11 due to air compression, based on the signal from the in-cylinder pressure sensor SW4. This is the "air compression pressure" of FIG. 3, which corresponds to a reference pressure.

As the cycle of the engine 100 progresses the first cycle, the second cycle, and so on, the temperature inside the cylinder 11 increases gradually. By measuring the reference pressure in the cylinder 11 whose intake valve 21 is first closed, the in-cylinder pressure sensor SW4 can measure the reference pressure correctly.

For the cylinder 11 whose intake valve 21 is closed next, the ECU 10 causes the injector 6 to inject fuel for analysis into the cylinder 11 at a specific timing after IVC.

Here, the injector 6 may inject a small amount of fuel with which the high-temperature oxidation reaction does not occur, into the cylinder 11 as the fuel for analysis.

When the fuel is injected into the cylinder 11 in compression stroke during which the temperature and the pressure inside the cylinder 11 increase gradually, the temperature and the pressure inside the cylinder 11 drop temporarily below those for the reference pressure due to the latent heat of the vaporizing fuel. Then, the fuel reaches, in the cylinder 11 where the pressure increases gradually with the ascent of the piston 3, the low-temperature oxidation reaction through fission, atomization, evaporation, and mixing with air according to the progress of time in the cylinder 11 where the pressure increases gradually with the ascent of the piston 3. Meanwhile, the pressure and the temperature inside the cylinder 11 are resumed to the reference pressure and the corresponding reference temperature.

Here, if the property of fuel (for example, the boiling point and/or the latent heat of vaporization) differs, since a period of time from the fuel injection into the cylinder 11 to the evaporation of the fuel differs, a period of time after the pressure inside the cylinder 11 is dropped below the reference pressure until it returns to the reference pressure differs. A broken line in FIG. 3 illustrates the pressure increase when the standard fuel is injected into the cylinder 11. If it is the standard fuel, the pressure inside the cylinder 11 returns to the reference pressure at a timing when a reference period tx is passed from the close timing of the intake valve 21 (IVC) through the fuel injection.

Contrary to the standard fuel, when a different type of fuel with different property is injected into the cylinder 11, the pressure inside the cylinder 11 becomes different because of the different evaporation rate. A dotted line in FIG. 3 illustrates the pressure increase when the different type of fuel which is easier to evaporate than the standard fuel is injected into the cylinder 11. Since the different type of fuel has a short period of time until it results in evaporation, a crank angle period from the close timing of the intake valve 21 which is required for the pressure inside the cylinder 11 returning to the reference pressure (i.e., a measured period t1) is shorter than a crank angle period of the standard fuel (i.e., the reference period tx). Further, a one-dot chain line in FIG. 3 illustrates the pressure increase when a different type of fuel which is more difficult to evaporate than the standard fuel is injected into the cylinder 11. Since the different type of fuel has a longer period of time until it results in evaporation, the crank angle period from the close timing of the intake valve 21, which is required for the pressure inside the cylinder 11 returning to the reference pressure (i.e., a measured period t2) is longer than the crank angle period tx of the standard fuel.

The memory 102 stores information on the property of the standard fuel. Based on the information on the standard fuel, the ECU 10 can acquire the reference period tx from the close timing of the intake valve 21 (IVC) until the pressure inside the cylinder 11 returning to the reference pressure.

The ECU 10 acquires, based on the measurement signals of the in-cylinder pressure sensor SW4 and the crank angle sensor SW6, a crank angle period t from the close timing of the intake valve 21 until the pressure value inside the cylinder 11 reaches the reference pressure after the injector 6 injects the fuel for analysis, and the ECU 10 compares the measured crank angle period t with the reference period tx of the standard fuel. If the measured crank angle period t matches with the reference period tx, the ECU 10 can determine that the property of the fuel injected from the injector 6 matches the property of the standard fuel. If the measured crank angle period t is shorter than the reference period tx, the ECU 10 can determine that the fuel injected from the injector 6 is easier to evaporate than the standard fuel. If the measured crank angle period t is longer than the reference period tx, the ECU 10 can determine that the fuel injected from the injector 6 is more difficult to evaporate than the standard fuel.

Here, the ECU 10 may determine the property of fuel based on the crank angle period t measured in one cylinder 11. Further, the ECU 10 may measure the crank angle period t not only in one cylinder 11, but also in each of the plurality of cylinders 11 in which compression stroke takes place thereafter, and may determine the property of fuel based on an average value of the plurality of crank angle periods t. The ECU 10 may measure the crank angle periods t for 4 to 5 cycles, for example.

When the crank angle period t is measured for each of the plurality of cylinders 11, since the piston speed increases as the cycle of the engine 100 during the motoring progresses, the temperature inside the cylinder 11 also increases. When the temperature inside the cylinder 11 increases, since the fuel injected into the cylinder 11 evaporates easily, the time for reaching the reference pressure is influenced by the temperature change inside the cylinder 11.

Figure 4:
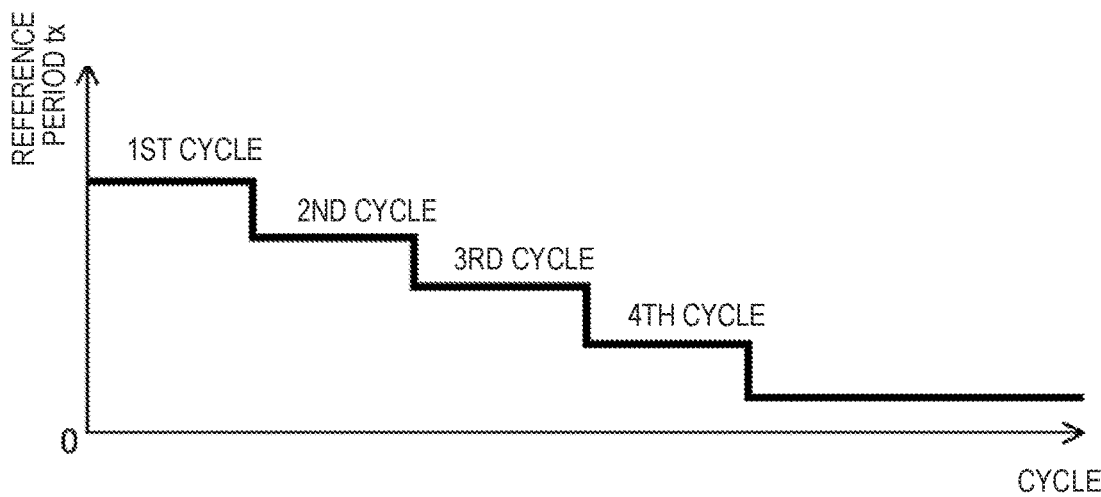
FIG. 4 illustrates a relationship between a progress of a cycle and a reference period.

Thus, the ECU 10 may change the length of the reference period tx according to the progress of the cycle of the engine 100. FIG. 4 illustrates a relationship between the progress of the cycle of the engine 100 and the length of the reference period tx. As the cycle of the engine 100 progresses as the first cycle, the second cycle, the third cycle, and the fourth cycle, the length of the reference period tx becomes shorter in a stepwise fashion by a given reducing amount defined beforehand. By doing so, the influence of the temperature inside the cylinder 11 increasing gradually can be eliminated, and the ECU 10 can determine the difference in the pressure increase inside the cylinder 11 only resulting from the property of fuel.

(Control of Engine According to Fuel Property)

After the startup of the engine 100 is finished, the ECU 10 operates the engine 100, while correcting the injection timing of fuel and/or the close timing of the intake valve 21 (IVC) according to the determined property of fuel. Thus, even if the property of fuel differs, its combustion can be equivalent to the combustion of the standard fuel, and therefore, it is advantageous to the improvement in fuel efficiency of the engine 100 and the improvement in emission gas performance. Further, the increase in the combustion noise can be suppressed.

Figure 5:
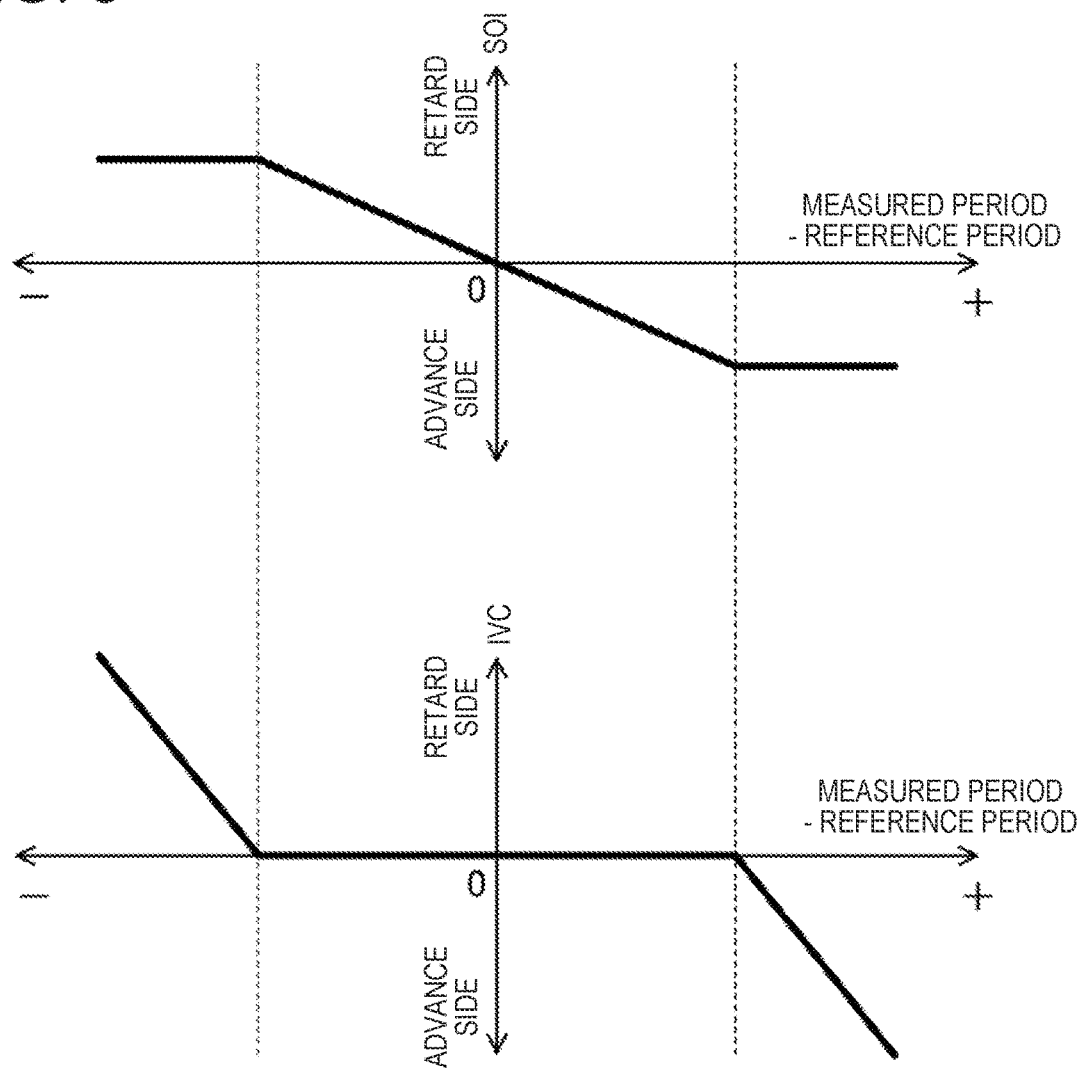
FIG. 5 illustrates a correction map of a fuel injection start timing and a valve close timing of an intake valve.

FIG. 5 illustrates a correction map of the fuel injection timing (upper figure), and a correction map of the valve close timing (lower figure). These correction maps are stored in the memory 102 of the ECU 10. In each correction map, the horizontal axis is a measured value of {crank angle period}-{reference period}, where the left side (i.e., negative) in this drawing indicates that the measured crank angle period t is shorter than the reference period tx, and the right side (i.e., positive) in this drawing indicates that the measured crank angle period t is longer than the reference period tx.

When the measured crank angle period t is longer than the reference period tx, this fuel is relatively difficult to evaporate. Thus, as illustrated in the upper figure of FIG. 5, the ECU 10 corrects a start timing of the fuel injection (SOI) to an advancing side. When the start timing of the fuel injection is advanced, the evaporation time of the fuel can be secured for a longer period of time. Since the fuel evaporates at a desired timing even if the fuel is difficult to evaporate, this combustion becomes equivalent to the combustion of the standard fuel.

On the contrary, when the measured crank angle period t is shorter than the reference period tx, the fuel is relatively easy to evaporate. Thus, as illustrated in the upper figure of FIG. 5, the ECU 10 corrects the fuel injection start timing (SOI) to a retarding side. Since the timing of finishing the evaporation of the fuel becomes later as the fuel injection start timing is retarded, the fuel evaporates at a desired timing. Even if the fuel is easy to evaporate, this combustion becomes equivalent to the combustion of the standard fuel.

In more detail, the control map of the upper figure of FIG. 5 is configured so that the fuel injection start timing is corrected (advanced) when the measured crank angle period t becomes longer than the reference period tx, and the fuel injection start timing is corrected (retarded) when the measured crank angle period t becomes shorter than the reference period tx. Therefore, the evaporation timing of the fuel is adjusted to a suitable timing.

Here, if the fuel injection start timing is excessively advanced, a period between the close timing of the intake valve 21 and the fuel injection start timing becomes too short, and therefore, the pressure inside the cylinder 11 at the fuel injection start timing becomes low. If the pressure inside the cylinder 11 is too low, a differential pressure between the injection pressure of the fuel and the pressure inside the cylinder 11 increases, and a penetrating force (penetration) of the fuel spray increases. As a result, the injected fuel adheres to the surface of the cylinder 11, etc., thereby impeding the evaporation of the fuel. Thus, in the control map illustrated in the upper figure of FIG. 5, an advancing limit is set for the fuel injection start timing. When the fuel injection start timing reaches the advancing limit, the ECU 10 corrects, as illustrated in the lower figure of FIG. 5, so that the close timing of the intake valve 21 is advanced when the measured crank angle period t becomes longer than the reference period tx. Thus, since the temperature and the pressure inside the cylinder 11 increase, the inside of the cylinder 11 becomes an environment where the fuel evaporates easily. Even if the fuel is difficult to evaporate, this combustion becomes equivalent to the combustion of the standard fuel.

On the other hand, if the fuel injection start timing is excessively retarded, an end timing of the fuel injection becomes closer to a compression top dead center, and this causes that the evaporation time of the fuel injected in the second half becomes too short. This tends to cause generation of soot. Thus, in the control map illustrated in the upper figure of FIG. 5, a retard limit is set for the fuel injection start timing. If the fuel injection start timing reaches the retard limit, the ECU 10 corrects, as illustrated in the lower figure of FIG. 5, so that the close timing of the intake valve 21 is retarded when the measured crank angle period t becomes shorter than the reference period tx. Thus, since the temperature and the pressure inside the cylinder 11 drop, the evaporation of the fuel becomes slow. When the fuel evaporates easily, this combustion becomes equivalent to the combustion of the standard fuel.

(Control Flow)

Figure 6:
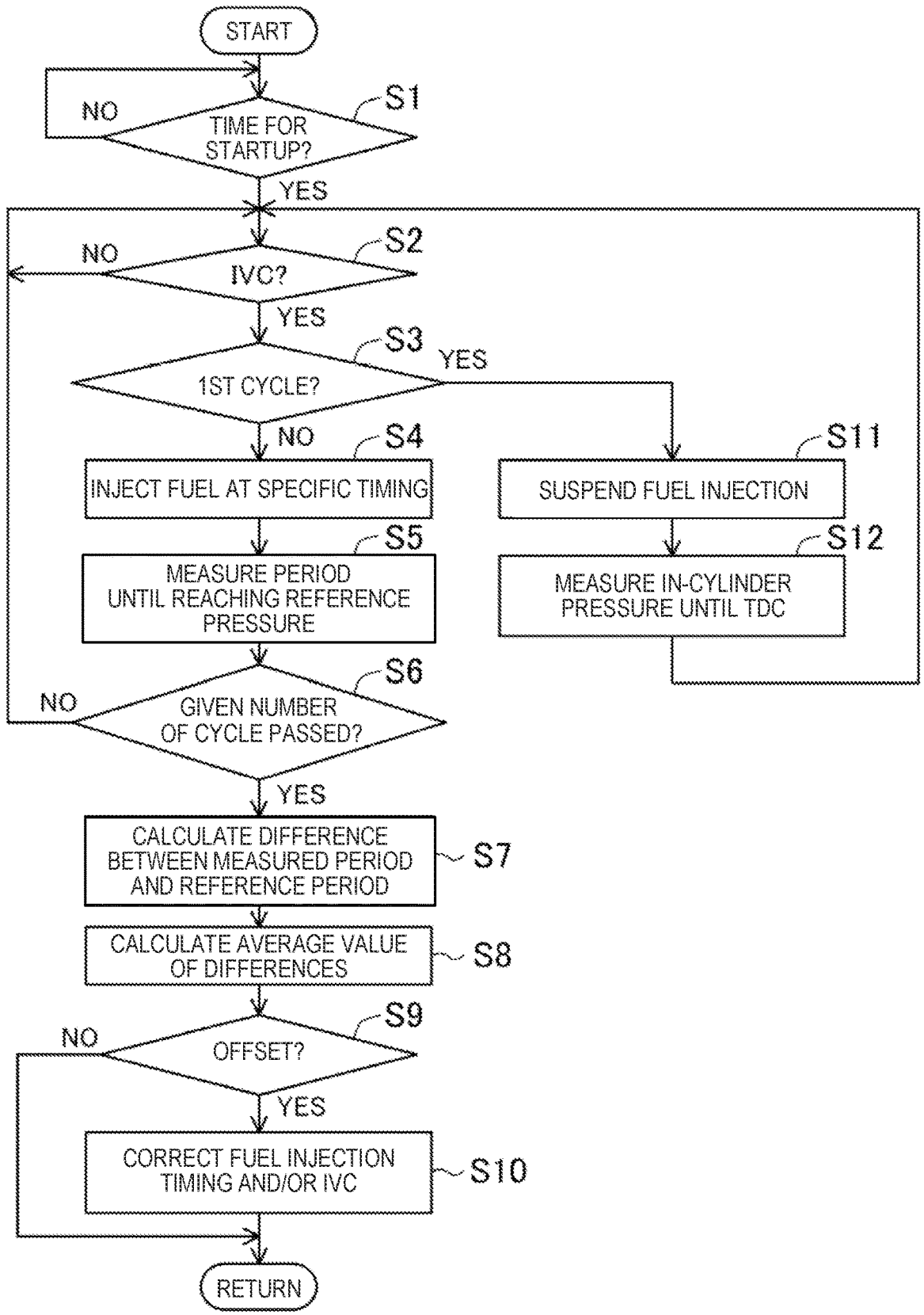
FIG. 6 illustrates a control flow of the engine system executed by a controller.

Next, a procedure of the control executed by the ECU 10 is described with reference to a flow of FIG. 6. First, after the start, at Step S1, the ECU 10 determines whether it is time for starting the engine 100. If not the time for a startup, the process repeats Step S1, and if it is the time for a startup, the process shifts to Step S2.

At Step S2, the ECU 10 determines whether the close timing of the intake valve 21 is reached in any one of the cylinders 11. If the determination at Step S2 is NO, the process repeats Step S2. If the determination at Step S2 is YES, the process shifts to Step S3.

At Step S3, the ECU 10 determines whether the cylinder 11 which reached the valve close timing is the cylinder 11 of the first cycle since the crankshaft 15 started rotation. If it is the first cycle, the process shifts to Step S11, and if it the second or subsequent cycle, the process shifts to Step S4.

At Step S11, the ECU 10 suspends the fuel injection to the cylinder 11. At the subsequent Step S12, the ECU 10 measures the pressure inside the cylinder 11, from the close timing of the intake valve 21 to a compression top dead center, based on the measurement signal of the in-cylinder pressure sensor SW4. That is, it measures the reference pressure.

At Step S4, the ECU 10 causes the injector 6 to inject the fuel for analysis at a specific timing after the intake valve 21 of the cylinder 11 of the second or subsequent cycle is closed, and at subsequent Step S5, the ECU 10 acquires the crank angle period t from the close timing of the intake valve 21 to the timing of the pressure inside the cylinder 11 reaching the reference pressure, based on the measurement signals of the in-cylinder pressure sensor SW4 and the crank angle sensor SW6.

At Step S6, the ECU 10 determines whether the number of cycles passed the given cycle after the motoring of the engine 100 is started. This given cycle is the number of cycles for measuring the crank angle period, and, for example, it may be 4 to 5 cycles. If the determination at Step S6 is NO, the process returns to Step S2.

Note that, if the number of cycles is the third or subsequent cycle after returned to Step S3, the ECU 10 performs Steps S3-S5, while changing the reference period tx according to the map of FIG. 4. In this way, the fuel injection into the cylinder 11 and the measurement of the crank angle period are repeated for a plurality of times.

If the determination at Step S6 becomes YES, the process shifts to Step S7. The ECU 10 calculates the differences between the plurality of measured crank angle periods t and the reference period tx, and at the subsequent Step S8, it calculates the average value of the plurality of differences calculated at Step S7. Then, at Step S9, the ECU 10 determines whether there is any offset between the average value of the measured crank angle periods and the reference period, and if there is any offset, the process shifts to Step S10, where the ECU 10 corrects, according to the control map in FIG. 5, the fuel injection timing and/or the close timing of the intake valve 21 after the startup of the engine 100 is finished, based on the property of the fuel. On the other hand, if there is no offset, the ECU 10 does not correct the fuel injection timing and the close timing of the intake valve 21.

According to the method of controlling the engine 100 and the engine system 1 disclosed herein, the ECU 10 can determine the fuel property with sufficient accuracy because the fuel for analysis is injected into the cylinder 11 in compression stroke, during motoring of the engine 100.

Further, since the combustion under operation of the engine 100 becomes equivalent to the combustion of the standard fuel by correcting the controlled variables of the engine 100 according to the determined property of the fuel, the improvement in fuel efficiency and the improvement in emission gas performance are achieved. In addition, the increase in combustion noise can be suppressed.

Note that the technique disclosed herein is not limited to being applying to the engine system 1 having the configuration described above. The technique disclosed herein is applicable to engine systems 1 of various configurations. For example, the technique disclosed herein is also applied to diesel engines.

Further, the technique disclosed herein is also applicable to so-called "hybrid vehicles." In this case, the engine motoring may be performed by a generator. Further, in the hybrid vehicle, an engine may be started in response to a power generation demand or a torque demand. The ECU 10 may determine the fuel property, when the engine is started, according to the power generation demand or the torque demand.

Further, although in the above configuration the pressure measured by the in-cylinder pressure sensor SW4 is used as the reference pressure in the cylinder 11 of the first cycle, it is not limited to this configuration, but the ECU 10 may set the reference pressure by calculating the pressure change inside the cylinder 11 in compression stroke, from the temperature and the pressure of intake air supplied to the cylinder 11, based on the measurement signals of the air flow sensor SW1, the intake air temperature sensor SW2, and the intake pressure sensor SW3.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
10 ECU (Controller)
100 Engine
11 Cylinder
15 Crankshaft
21 Intake Valve
6 Injector
SW4 In-cylinder Pressure Sensor
SW6 Crank Angle Sensor

What is claimed is:

1. A method of controlling an engine, comprising the steps of:
during motoring of the engine, outputting, by an in-cylinder pressure sensor, to a controller a signal indicative of a reference pressure corresponding to a pressure change inside a cylinder of the engine after an intake valve of the cylinder is closed when a fuel injection is not performed;

during motoring of the engine after the reference pressure is outputted, injecting, by an injector, fuel for analysis into the cylinder at a specific timing after the intake valve is closed;

acquiring, by the controller, a crank angle period from the close timing of the intake valve, through the fuel injection, to a timing of the pressure inside the cylinder reaching the reference pressure, based on signals from the in-cylinder pressure sensor and a crank angle sensor; and determining, by the controller, a property of the fuel injected by the injector by comparing the acquired crank angle period with a reference crank angle period from the close timing of the intake valve to a timing of the pressure inside the cylinder reaching the reference pressure after a standard fuel is injected into the cylinder at the specific timing, based on stored information on a reference property of the standard fuel.

2. The method of claim 1, wherein the cylinder is one of a plurality of cylinders, and wherein the in-cylinder pressure sensor outputs a signal indicative of the reference pressure in the cylinder, out of the plurality of cylinders, whose intake valve is closed first after a crankshaft of the engine starts rotation.

3. The method of claim 2, wherein the injector injects the fuel for analysis into each of the plurality of cylinders as a cycle of the engine progresses, wherein the controller acquires the crank angle period for each of the plurality of cylinders, and the controller compares an average value of the plurality of crank angle periods with the reference crank angle period to determine the property.

4. The method of claim 3, wherein the reference crank angle period becomes shorter as the cycle progresses.

5. The method of claim 4, wherein the controller corrects at least one of a start timing of the fuel injection and the close timing of the intake valve, according to the property of the fuel, after the startup of the engine is finished.

6. The method of claim 5, wherein when the acquired crank angle period is longer than the reference crank angle period, the controller corrects the fuel injection start timing to an advancing side, and when the acquired crank angle period is shorter than the reference crank angle period, the controller corrects the injection start timing of the fuel to a retarding side.

7. The method of claim 6, wherein the controller corrects the fuel injection start timing so that the fuel injection start timing is advanced when the acquired crank angle period is longer than the reference crank angle period, and wherein when the fuel injection timing reaches a first timing on the advancing side, the controller advances the close timing of the intake valve when the acquired crank angle period is longer than the reference crank angle period.

8. The method of claim 7, wherein the controller corrects the fuel injection start timing so that the fuel injection start timing is retarded when the acquired crank angle period is shorter than the reference crank angle period, and wherein when the fuel injection timing reaches a second timing on the retarding side, the controller retards the close timing of the intake valve when the acquired crank angle period is shorter than the reference crank angle period.

9. The method of claim 1, wherein the controller corrects at least one of a start timing of the fuel injection and the close timing of the intake valve, according to the property of the fuel, after the startup of the engine is finished.

10. The method of claim 2, wherein the controller corrects at least one of a start timing of the fuel injection and the close timing of the intake valve, according to the property of the fuel, after the startup of the engine is finished.

11. The method of claim 3, wherein the controller corrects at least one of a start timing of the fuel injection and the close timing of the intake valve, according to the property of the fuel, after the startup of the engine is finished.

12. The method of claim 9, wherein when the acquired crank angle period is longer than the reference crank angle period, the controller corrects the fuel injection start timing to an advancing side, and when the acquired crank angle period is shorter than the reference crank angle period, the controller corrects the injection start timing of the fuel to a retarding side.

13. The method of claim 10, wherein when the acquired crank angle period is longer than the reference crank angle period, the controller corrects the fuel injection start timing to an advancing side, and when the acquired crank angle period is shorter than the reference crank angle period, the controller corrects the injection start timing of the fuel to a retarding side.

14. The method of claim 11, wherein when the acquired crank angle period is longer than the reference crank angle period, the controller corrects the fuel injection start timing to an advancing side, and when the acquired crank angle period is shorter than the reference crank angle period, the controller corrects the fuel injection start timing to a retarding side.

15. The method of claim 12, wherein the controller corrects the fuel injection start timing so that the injection start timing of the fuel is advanced when the acquired crank angle period is longer than the reference crank angle period, and wherein when the fuel injection timing reaches a first timing on the advancing side, the controller advances the close timing of the intake valve when the acquired crank angle period is longer than the reference crank angle period.

16. The method of claim 13, wherein the controller corrects the fuel injection start timing so that the fuel injection start timing is advanced when the acquired crank angle period is longer than the reference crank angle period, and wherein when the fuel injection timing reaches a first timing on the advancing side, the controller advances the close timing of the intake valve when the acquired crank angle period is longer than the reference crank angle period.

17. The method of claim 14, wherein the controller corrects the fuel injection start timing so that the fuel injection start timing is advanced when the acquired crank angle period is longer than the reference crank angle period, and wherein when the fuel injection timing reaches a first timing on the advancing side, the controller advances the close timing of the intake valve when the acquired crank angle period is longer than the reference crank angle period.

18. The method of claim 12,
wherein the controller corrects the fuel injection start timing so that the fuel injection start timing is retarded when the acquired crank angle period is shorter than the reference crank angle period, and
wherein when the fuel injection timing reaches a second timing on the retarding side, the controller retards the close timing of the intake valve when the acquired crank angle period is shorter than the reference crank angle period.

19. The method of claim 13,
wherein the controller corrects the fuel injection start timing so that the fuel injection start timing is retarded when the acquired crank angle period is shorter than the reference crank angle period, and
wherein when the fuel injection timing reaches a second timing on the retarding side, the controller retards the close timing of the intake valve when the acquired crank angle period is shorter than the reference crank angle period.

20. An engine system including an engine, comprising:
a controller that stores information regarding a property of a standard fuel;
an injector that injects fuel into a cylinder of the engine, in response to a control signal of the controller;
an in-cylinder pressure sensor that is attached to the engine, and outputs to the controller a pressure signal corresponding to a pressure inside the cylinder; and
a crank angle sensor that is attached to the engine, and outputs to the controller a crank angle signal corresponding to a crank angle of the engine,
wherein during motoring of the engine, the in-cylinder pressure sensor outputs a signal indicative of a reference pressure corresponding to a pressure change inside the cylinder after an intake valve of the cylinder is closed when a fuel injection is not performed,
wherein during motoring of the engine after the reference pressure is outputted, the controller causes the injector to inject fuel for analysis at a specific timing after the intake valve is closed,
wherein the controller acquires a crank angle period from the close timing of the intake valve, through the fuel injection, to a timing of the pressure inside the cylinder reaching the reference pressure, based on the crank angle signal of the crank angle sensor and the pressure signal of the in-cylinder pressure sensor, and
wherein the controller determines a property of the fuel injected by the injector based on a comparison of the acquired crank angle period with a reference crank angle period from the close timing of the intake valve to a timing of the pressure inside the cylinder reaching the reference pressure after the standard fuel is injected into the cylinder at the specific timing, based on stored information on a reference property of the standard fuel.

\* \* \* \* \*